United States Patent
Choi

(10) Patent No.: US 10,204,325 B2
(45) Date of Patent: Feb. 12, 2019

(54) APPARATUS AND METHOD FOR DETECTING OBJECT AND FINANCIAL APPARATUS USING THE SAME

(71) Applicant: ATEC AP CO., LTD., Seongnam-si, Gyeonggi-do (KR)

(72) Inventor: Yoon Seok Choi, Seoul (KR)

(73) Assignee: ATEC AP CO., LTD., Seongnam-si, Gyeonggi-do (KR)

( * ) Notice: Subject to any disclaimer, the term of this patent is extended or adjusted under 35 U.S.C. 154(b) by 636 days.

(21) Appl. No.: 14/750,545

(22) Filed: Jun. 25, 2015

(65) Prior Publication Data
US 2015/0379490 A1 Dec. 31, 2015

(30) Foreign Application Priority Data
Jun. 27, 2014 (KR) .................. 10-2014-0080068

(51) Int. Cl.
*G06Q 20/10* (2012.01)
*G01S 17/02* (2006.01)
(Continued)

(52) U.S. Cl.
CPC ........ *G06Q 20/1085* (2013.01); *G01S 17/026* (2013.01); *G07D 7/12* (2013.01);
(Continued)

(58) Field of Classification Search
CPC .... G06Q 20/1085; G01S 17/026; G07D 7/12; G07D 7/121
See application file for complete search history.

(56) References Cited

U.S. PATENT DOCUMENTS 3,774,046 A * 11/1973 Hoch ...................... G07D 7/12
250/485.1
6,064,062 A * 5/2000 Bohn ................... H04N 1/0315
250/237 R
(Continued)

FOREIGN PATENT DOCUMENTS

CN 101794476 A 8/2010
JP 2000-056034 A 2/2000
(Continued)

OTHER PUBLICATIONS

Office Action dated Jul. 17, 2017 in Chinese Application No. 201510358880.4.

*Primary Examiner* — Dominic J Bologna
(74) *Attorney, Agent, or Firm* — Saliwanchik, Lloyd & Eisenschenk

(57) ABSTRACT

Disclosed herein are an object detection apparatus for detecting an object and a financial apparatus using the same. In an embodiment, the object detection apparatus may include a light emission unit configured to emit light and a light-reception unit configured to receive both direct light that is emitted by the light emission unit and reflected light of the light emitted by the light emission unit which is reflected by an object to be detected. In accordance with an embodiment of the present invention, the object detection apparatus can perform self-diagnosis, such as autonomously determining whether a failure is present and measuring sensitivity, although an object, that is, the subject of detection, is not present and process media, such as bills. Accordingly, performance in detecting a medium can be improved in financial apparatuses that perform deposit and withdrawal.

10 Claims, 4 Drawing Sheets

(51) Int. Cl.
*G07D 7/12* (2016.01)
*G07D 7/121* (2016.01)
*G07F 19/00* (2006.01)

(52) U.S. Cl.
CPC .......... *G07D 7/121* (2013.01); *G07F 19/201* (2013.01); *G07F 19/209* (2013.01)

(56) References Cited

U.S. PATENT DOCUMENTS

| | | | |
|---|---|---|---|
| 7,084,416 B2* | 8/2006 | Suzuki | G07D 7/121 |
| | | | 194/207 |
| 7,170,074 B2* | 1/2007 | Baudat | G07D 7/12 |
| | | | 250/556 |
| 8,260,027 B2* | 9/2012 | Nireki | G07D 7/12 |
| | | | 382/135 |
| 2002/0079454 A1* | 6/2002 | Yamada | G07D 7/121 |
| | | | 250/358.1 |
| 2007/0108013 A1* | 5/2007 | Nago | G07D 7/121 |
| | | | 194/302 |
| 2010/0181162 A1* | 7/2010 | Nagami | G07D 7/121 |
| | | | 194/207 |
| 2013/0037705 A1* | 2/2013 | Soo | G01D 5/34715 |
| | | | 250/231.13 |

FOREIGN PATENT DOCUMENTS

| | | |
|---|---|---|
| JP | 2009-002830 A | 1/2009 |
| JP | 2013036999 A | 2/2013 |
| KR | 20130125150 A | 11/2013 |

\* cited by examiner

APPARATUS AND METHOD FOR DETECTING OBJECT AND FINANCIAL APPARATUS USING THE SAME

CROSS-REFERENCE TO RELATED APPLICATION

This application claims the benefit 35 U.S.C. § 119 of Korean Application No. 10-2014-0080068, filed on Jun. 27, 2014, which is incorporated hereby referenced in its entirety.

BACKGROUND

Technical Field

The present disclosure relates to an apparatus and method for detecting an object and a financial apparatus using the same.

Related Art in general, a reflection type photosensor includes a light emitter and an optical receiver on the same side of a medium to be detected. The presence of the medium is detected when light emitted by the light emitter is reflected by a surface of the reflector and received by the optical receiver.

If a reflector is not present, a conventional reflection type photosensor is unable to perform sensitivity measurement and whether the reflection type photosensor operates is unable to be known. Accordingly, there is a problem in that whether the reflection type photosensor normally operates cannot be determined.

BRIEF SUMMARY

Various embodiments are directed to an object detection apparatus capable of self-diagnosis, such as whether a failure is present and sensitivity measurement, regardless of whether an object is present and a financial apparatus using the same.

In an embodiment, an object detection apparatus may include a light emission unit configured to emit light and a light-reception unit configured to receive both direct light that is emitted by the light emission unit and reflected light of the light emitted by the light emission unit which is reflected by an object to be detected.

In an embodiment, a method of detecting, by the object detection apparatus, an object may include emitting light of a specific amount or more, receiving direct light of the emitted light of the specific amount or more, emitting light of less than a specific amount, and receiving reflected light of the emitted light of less than the specific amount.

In an embodiment, a financial apparatus may include a customer information acquisition unit configured to obtain customer information, a user interface unit configured to display a menu and information for deposit or withdrawal and to receive a command or information for deposit or withdrawal or have the command or information for deposit or withdrawal selected, and a medium processing apparatus configured to process a medium for deposit or withdrawal using an object detection apparatus for receiving both direct light that is emitted and reflected light of the emitted light which is reflected by an object to be detected.

DETAILED DESCRIPTION

Figure 1:
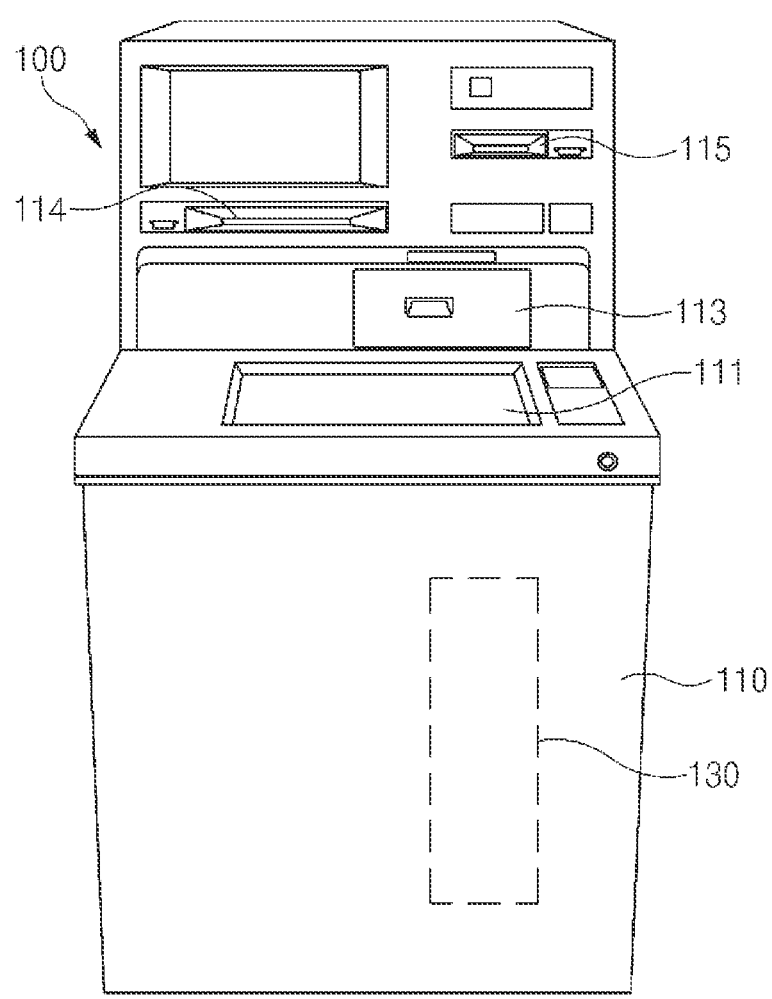
FIG. 1 is a perspective view of a financial apparatus in accordance with an embodiment of the present invention.

Hereinafter, an apparatus and method for detecting an object and a financial apparatus using the same be described in detail with reference to the accompanying drawings through various examples of embodiments. It is to be noted that in assigning reference numerals to elements in the drawings, the same reference numerals denote the same elements throughout it e drawings even iii cases where the elements are shown in different drawings. Furthermore, in describing the embodiments of the present invention, a detailed description of the known functions and constitutions will be omitted if it is deemed to make the gist of the present invention unnecessarily vague.

Furthermore, in describing the elements of this specification, terms, such as the first, the second, A, B, (a), and (b), may be used. However, although the terms are used only to distinguish one element from the other element, the essence, order, or sequence of the elements is not limited by the terms. When it is said that one element is "connected," "combined," or "coupled" with the other element, the one element may be directly connected or coupled with the other element, but it should also be understood that a third element may be "connected," "combined," or "coupled" between the two elements.

The financial apparatus in accordance with an embodiment of the present invention performs a financial task for receiving various media, such as bills, securities (including checks), giro, coins, and gift certificates, and performing medium processing, such as deposit processing, processing, such as giro receipt and the exchanges of gift certificates, withdrawal processing, and processing, such as the discharge of giro and gift certificates. For example, the financial apparatus may include an automated teller machine (ATM), such as a cash dispenser (CD) or a cash recycling device. However, the financial apparatus is not limited to the aforementioned examples and may include various apparatuses for automating financial tasks, such as a financial information system (FIS).

Hereinafter, the financial apparatus is assumed to be an ATM and embodiments of the present invention are described. The assumption is for convenience of description, and the technical spirit of the present invention should not be limited and applied to such an ATM.

FIG. 1 is a perspective view of a financial apparatus in accordance with an embodiment of the present invention.

Referring to FIG. 1, the financial apparatus 100 according to the present embodiment may include a main body 110 having a plurality of parts embedded therein. The main body 110 may include a medium input/output unit 113 for inputting and outputting a medium.

The medium input/output unit 113 may include a medium processing space accessible to customers. The processing space may be open and shut by a hiding member, such as a shutter or a cover or may remain open.

The medium input/output unit 113 may function as a common input/output unit through which a variety of types of media is input and output. A medium may be input to the medium input/output unit 113 in bundles including a sheet of paper. Furthermore, a medium may be output by the medium input/output unit 113 in bundles.

The financial apparatus 100 may further include a bankbook input/output unit 114 for inputting and outputting bankbooks and a card input/output unit 115 for inputting and outputting cards depending on the type of financial apparatus. In an embodiment of the present invention, the bankbook input/output unit 114 or the card input/output unit 115 may be named a customer information acquisition unit for obtaining customer information. In an embodiment of the present invention, the type of customer information acquisition unit is not limited. For example, customer information may be obtained by obtaining information recorded on an RFID tag or USB or using a fingerprint.

The financial apparatus 100 may further include a user interface unit 111 for displaying menus and information for deposit or withdrawal and for receiving commands or information for deposit or withdrawal or in which commands or information for deposit or withdrawal is selected.

The main body 110 may include a medium processing apparatus 130 for processing media. The medium processing apparatus 130 processes media, such as bill or checks, so that the media are input to and discharged from the medium processing apparatus 130 through the medium input/output unit 113 and the financial apparatus 100 performs deposit and withdrawal transactions on the media. The medium processing apparatus 130 is a concept including the medium input/output unit 113. In this case, the medium processing apparatus 130 recognizes a medium received through the medium input/output unit 113 and stores the medium in a medium storage box so that a deposit transaction is performed or recognizes a medium stored in the medium storage box and discharges the medium through the medium input/output unit 113 so that a withdrawal transaction is performed.

The medium processing apparatus 130 includes a medium transfer path in which a medium received for deposit or a medium to be discharged for withdrawal is transferred. Various detection units for detecting the presence of a transferred medium or the length or number of media are included in the medium transfer path. Furthermore, in addition to the medium transfer path, the medium input/output unit 113 or the medium storage box may include various object detection apparatuses for detecting the presence of a transferred medium or the length or number of media.

For example, the object detection apparatus may be implemented using a reflection type infrared (IR) sensor or a transmission type IR sensor. The reflection type IR sensor and the transmission type IR sensor may be selectively used depending on the type of object, that is, the subject of detection, and the characteristics of a space in which the object is placed.

In the case of the transmission type IR sensor, in general, a light emission unit and a light-reception unit are disposed in a straight line with an object to be detected interposed therebetween. If light emitted by the light emission unit is received by the light-reception unit, the transmission type IR sensor determines an object to be not detected. If light emitted by the light emission unit is not received by the light-reception unit, the transmission type IR sensor determines an object to be detected. Accordingly, the transmission type IR sensor may determine whether a failure has occurred when it is reset or whether the transmission type IR sensor itself is abnormal when performing sensitivity measurement or perform sensitivity measurement. In contrast, in the case of the reflection type IR sensor, in general, the light emission unit and the light-reception unit are disposed on one side of an object to be detected at a specific angle. If light emitted by the light emission unit is received by the light-reception unit, the reflection type IR sensor determines an object to be detected. If light emitted by the light emission unit is not received by the light-reception unit, the reflection type IR sensor determines an object to be not detected. Accordingly, the reflection type IR sensor is unable to determine whether a failure has occurred when it is reset or whether the reflection type IR sensor itself is abnormal when performing sensitivity measurement or to perform sensitivity measurement. That is, when the reflection type IR sensor is reset, light emitted by the light emission unit s not received by the light-reception unit because a medium is not present in the medium transfer path, and thus the reflection type IR sensor is unable to determine whether it is normal and to perform sensitivity measurement.

In an embodiment of the present invention, an object detection apparatus, such as the reflection type IR sensor, is implemented so that self-diagnosis is performed when resetting is performed. The object detection apparatus is described in detail below. Furthermore, the subject to be detected by the object detection apparatus is hereinafter assumed to be a medium. Such an assumption is for convenience of description, and the subject to be detected by the object detection apparatus in accordance with an embodiment of the present invention is not limited to a medium.

Figure 2:
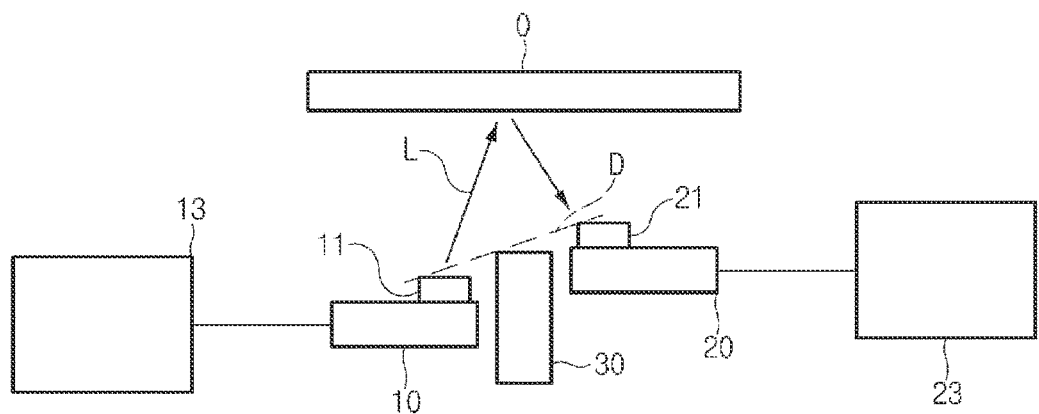
FIG. 2 is a diagram schematically illustrating the configuration of major elements of an object detection apparatus in accordance with an embodiment of the present invention.
Figure 3:
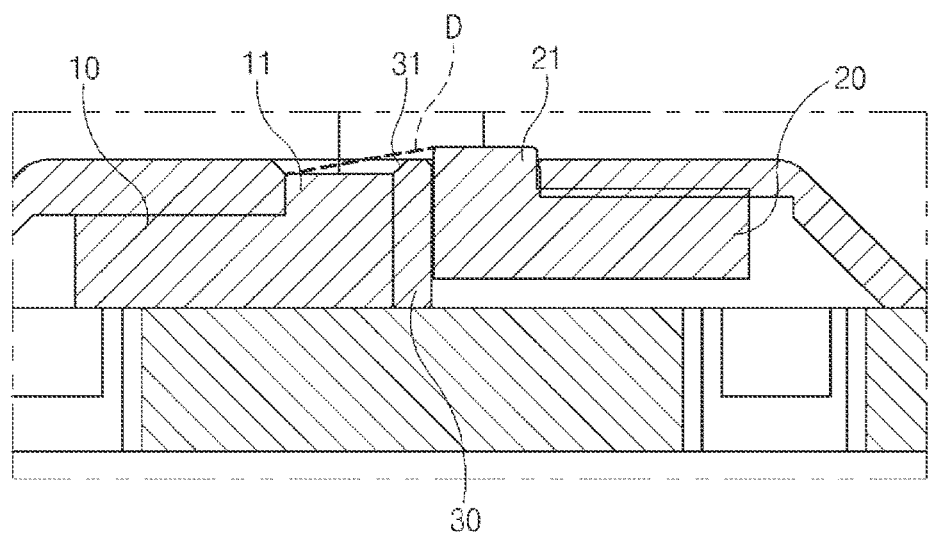
FIG. 3 is a schematic cross-sectional view illustrating the state in which the object detection apparatus of FIG. 2 has been implemented and used.

FIG. 2 is a diagram schematically illustrating the configuration of major elements of the object detection apparatus in accordance with an embodiment of the present invention, and FIG. 3 is a schematic cross-sectional view illustrating the state in which the object detection apparatus of FIG. 2 has been implemented and used.

As illustrated in FIGS. 2 and 3, the object detection apparatus in accordance with an embodiment of the present invention receives light L reflected by a medium O and detects an object (i.e., the medium O). The object detection apparatus may include a light emission unit 10 for emitting the light L toward the object O and a light-reception unit 20 for receiving both direct light that is emitted by the light emission unit 10 and directly incident thereon and the reflected light of the light L that is emitted by the light emission unit 10, reflected by the object O, and incident thereon.

In this case, the amount of the direct light may be smaller than the amount of the reflected light at a specific ratio. The distance between the object O and a location where the light-reception unit 20 receives light may be shorter than the distance between the object O and a location where the light emission unit 10 emits light.

Furthermore, the light emission unit 10 and the tight-reception unit 20 may be disposed so that the light-reception unit 20 receives the direct light only when the light L emitted by the light emission unit 10 is a specific amount or more.

That is, the light-reception unit 20 may be placed at a location higher than that of the light emission unit 10 so that it receives only reflected light, that is, the light L emitted by the light emission unit 10 and reflected by the medium O, under normal conditions. If the intensity of the light L emitted by the light emission unit 10 is greater than those under normal conditions, the light-reception unit 20 may receive the direct light, that is, the light L directly incident from the light emission unit 10.

In this case, the light emission unit 10 may emit light of a specific amount or more when the object detection apparatus is reset or when sensitivity measurement is performed.

Furthermore, a correlation between the locations of the light-reception unit 20 and the light emission unit 10 is not based on the gravity direction, but is based on the state in which the direction in which light is emitted by the light emission unit 10 is assumed to be the upper side and a direction opposite the direction is assumed to be the lower side.

Accordingly, for example, although the object detection apparatus of FIG. 2 or 3 is rotated 180°, the light-reception unit 20 is placed at a location higher than that of the light emission unit 10.

Furthermore, the same is true of other elements included in the object detection apparatus in accordance with an embodiment of the present invention.

A light unit 11 for emitting the light L is formed over the light emission unit 10. A light emission intensity control circuit 13 is electrically connected to the light emission unit 10, and enables the intensity of light emitted by the light emission unit 10 to be controlled.

In this case, the light emission intensity control circuit 13 enables a current control circuit to control the intensity of light emitted by the light unit 11 by controlling the amount of current that flows in the light emission unit 10.

A reception unit 21 for receiving the light L is formed over the light-reception unit 20. A light-receiving detection circuit 23 is electrically connected to the light-reception unit 20, and processes the light L received by the light-reception unit 20 in the form of an electrical signal.

The object detection apparatus in accordance with an embodiment of the present invention may further include a hiding member 30 disposed to hide the space between the light emission unit 10 and the light-reception unit 20 and configured to have the top higher than the light emission unit 10. In this case, one part of the light-reception unit 20 may be placed at a location higher than the upper end of the hiding member 30.

Figure 4:
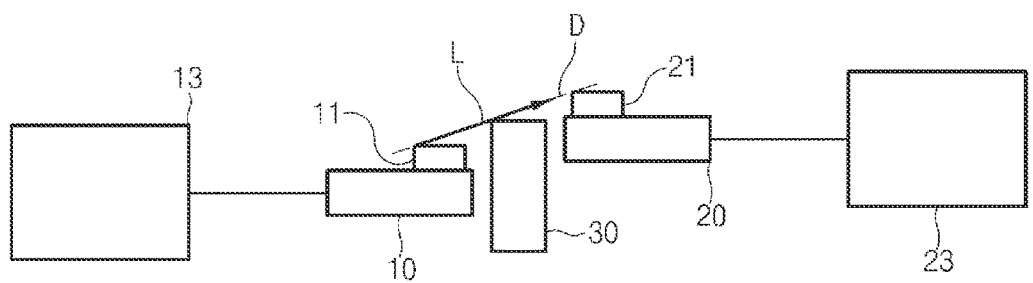
FIG. 4 is a diagram illustrating by an arrow that a light-reception unit directly receives light from a light emission unit when the light emission unit emits light stronger than that under normal conditions in FIG. 2.

FIG. 4 is a diagram illustrating by an arrow that the light-reception unit directly receives light from the light emission unit when the light emission unit emits light stronger than that under normal conditions in FIG. 2.

As illustrated in FIG. 4, the upper end of the reception unit 21 may be placed in a virtual straight line D that connects the upper end of the light unit 11 and the upper end of the hiding member 30 or may be placed at a location higher than the virtual straight line D. In this case, if the light unit 11 emits the light L with a higher intensity than that under normal conditions, the light L directly reaches the reception unit 21 and thus the reception unit 21 may receive direct light.

In this case, the light-reception unit 20 may also receive reflected light reflected by the object O in addition to the direct light directly reflected by the light emission unit 10.

Referring to FIG. 3, an incline plane 31 is formed at an edge that belongs to the upper end of the hiding member 30 and that is placed on the part of the light emission unit 10. In this case, if the light emission unit 10 emits the light L with a higher intensity than that under normal conditions, the reception unit 21 may easily receive direct light, that is, the light L emitted by the light unit 11.

Furthermore, in order to prevent a contamination on external surfaces of the light unit 11 and the reception unit 21, a protection cover (not illustrated), such as transparent glass or plastic, may be attached to the external surfaces.

Figure 5:
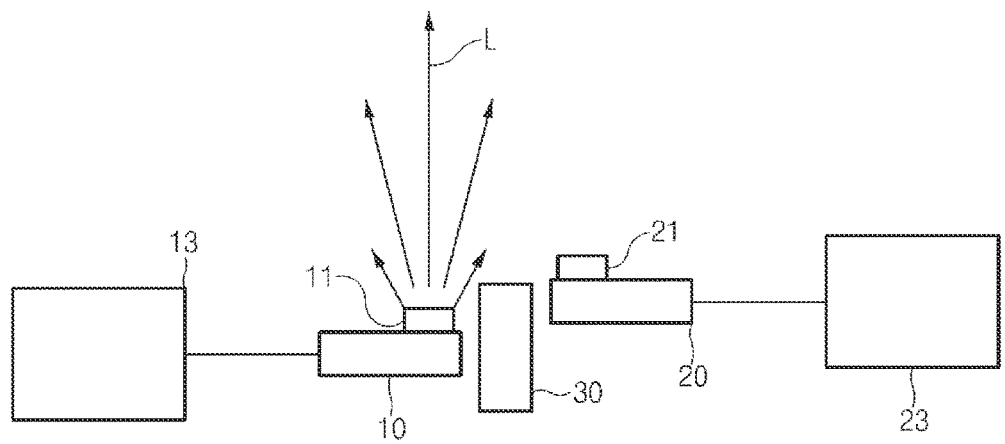
FIG. 5 is a diagram illustrating the state in which the light emission unit emits light under normal conditions in FIG. 2.

FIG. 5 is a diagram illustrating the state in which the light emission unit emits light under normal conditions in FIG. 2.

As illustrated in FIG. 5, under normal conditions, the intensity of the light L emitted by the light unit 11 is weak. Accordingly, the light L having the strongest intensity travels in a straight line, and the amount of the tight L is reduced toward the side. As a result, the reception unit 21 does not directly receive the light L emitted by the light unit 11 if the object O is not present.

Figure 6:
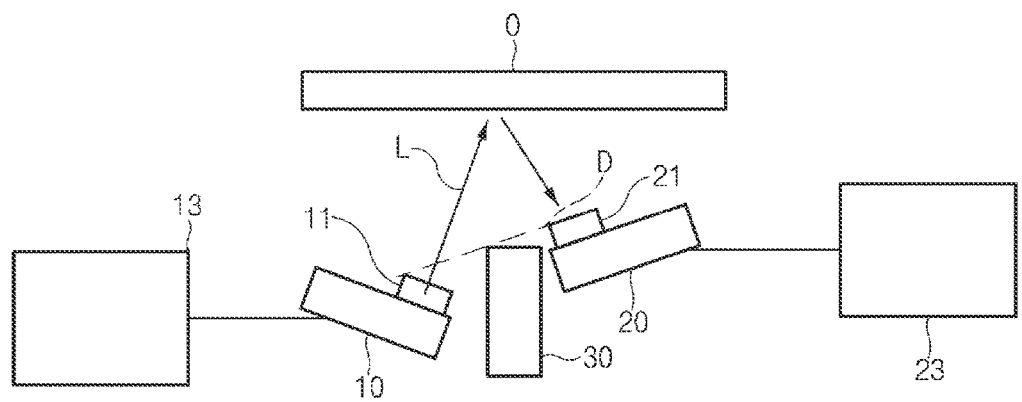
FIG. 6 is a schematic diagram illustrating the configuration of major elements of an object detection apparatus in accordance with another embodiment of the present invention.

FIG. 6 is a schematic diagram illustrating the configuration of major elements of the object detection apparatus in accordance with another embodiment of the present invention.

As illustrated in FIG. 6, in accordance with another embodiment of the present invention, in order to improve efficiency of reflected light of the light L that is emitted by the light emission unit 10 and reflected by the medium O, the light emission unit 10 may be disposed to be inclined toward the light-reception unit 20 and the light-reception unit 20 may be disposed to be inclined toward the light emission unit 10. In this case, the light-reception unit 20 may more easily receive the light L emitted by the light emission unit 10.

Furthermore, the upper end of the reception unit 21 of the light-reception unit 20 may be placed in a virtual straight line D that connects the upper end of the light unit 11 of the light emission unit 10 and the upper end of the hiding member 30 or may be placed at a location higher than the virtual straight line D. In this case, the reception unit 21 may directly receive the light L emitted by the light unit 11 only when the light L having intensity stronger than that under normal conditions is emitted by the light unit 11.

A method of detecting an object in the object detection apparatus constructed as above in accordance with an embodiment of the present invention may include emitting, by the object detection apparatus, light of a specific amount or more, receiving direct light of the emitted light of the specific amount or more, emitting light of less than a specific amount, and receiving reflected light of the emitted light of less than the specific amount.

As described above, the object detection apparatus in accordance with an embodiment of the present invention can perform self-diagnosis, such as autonomously determining whether a failure is present and measuring sensitivity, although an object, that is, the subject of detection, is not present and process media, such as bills. Accordingly, performance in detecting a medium can be improved in financial apparatuses that perform deposit and withdrawal.

If all elements that form an embodiment of the present invention have been described as being combined into one or as operating in combination, the present invention is not necessarily limited to such an embodiment. That is, one or more of all elements may be selectively combined and operated if they fall within the object of the present invention. Furthermore, the terms described above, such as "include", "comprise, and "have", unless explicitly described to the contrary, are meant to include corresponding elements and should be understood to imply the inclusion of stated elements but not the exclusion of any other elements. All terms used herein, including technical terms or scientific terms, have the same meanings as those generally understood by persons of ordinary skill in the technical field to which the present invention pertains. The terms, such as terms that are generally used and defined in dictionaries, should be construed as having meanings identical to those that are used in the context of related technology, and should not be construed as having ideal or excessively formal meanings unless explicitly defined otherwise.

While some exemplary embodiments of the present invention have been described with reference to the accompanying drawings, those skilled in the art may change and modify the present invention in various ways without departing from the essential characteristic of the present invention. Accordingly, the disclosed embodiments should not be construed as limiting the technical spirit of the present invention, but should be construed as illustrating the technical spirit of the present invention. The scope of the technical spirit of the present invention is not restricted by the embodiments, and the scope of the present invention should be interpreted based on the following appended claims. Accordingly, the present invention should be construed as covering all modifications or variations derived from the meaning and scope of the appended claims and their equivalents.

What is claimed is:

1. An object detection apparatus, comprising:
   a light emitter that emits light;
   a light receiver that receives both direct light that is emitted by the light emitter and reflected light of the light emitted by the light emitter that is reflected by an object to be detected; and
   a hiding member disposed between the light emitter and the light receiver and having an upper end higher than the light emitter,
   wherein an upper end of the light receiver that receives light is located in a virtual straight line that connects an upper end of the light emitter that emits light and the upper end of the hiding member or is located at a location higher than the virtual straight line.

2. The object detection apparatus of claim 1, wherein an amount of the direct light is smaller than an amount of the reflected light.

3. The object detection apparatus of claim 1, wherein an amount of the direct light is smaller than an amount of the reflected light at a specific ratio.

4. The object detection apparatus of claim 1, wherein a distance between the object and a location where the light receiver receives light is smaller than a distance between the object and a location where the light emitter emits light.

5. The object detection apparatus of claim 1, wherein the light emitter and the light receiver are disposed to receive the direct light only when the light emitted by the light emitter is a specific amount or more.

6. The object detection apparatus of claim 5, wherein the light emitter emits the light of the specific amount or more when the object detection apparatus is reset or measures sensitivity.

7. The object detection apparatus of claim 1, further comprising an incline plane formed at the upper end of the hiding member to receive light emitted by the light emitter if the light emitted by the light emitter has intensity stronger than intensity under normal conditions to detect the object.

8. The object detection apparatus of claim 1, wherein at least one of the light emitter and the light receiver is disposed to be inclined toward the hiding member.

9. The object detection apparatus of claim 1, wherein the light receiver receives only the direct light if the object is not present and receives only the reflected light if the object is present.

10. A financial apparatus, comprising:
    a customer information acquisition unit configured to obtain customer information;
    a user interface unit configured to display a menu and information for deposit or withdrawal and to receive a command or information for deposit or withdrawal or have the command or information for deposit or withdrawal selected; and
    a medium processing apparatus configured to process a medium for deposit or withdrawal using an object detection apparatus according to claim 1.

* * * * *